Feb. 28, 1956 E. J. HAZEN 2,736,499
FLUID TEMPERATURE CONTROL
Filed Feb. 8, 1952 3 Sheets-Sheet 1

INVENTOR.
EDWARD J. HAZEN
BY
Herbert L. Davis
ATTORNEY

Feb. 28, 1956  E. J. HAZEN  2,736,499
FLUID TEMPERATURE CONTROL
Filed Feb. 8, 1952  3 Sheets-Sheet 3

INVENTOR.
EDWARD J. HAZEN
BY Herbert L. Davis
ATTORNEY

United States Patent Office 2,736,499
Patented Feb. 28, 1956

2,736,499

FLUID TEMPERATURE CONTROL

Edward J. Hazen, Woodcliff Lake, N. J., assignor to Bendix Aviation Corporation, Teterboro, N. J., a corporation of Delaware Application February 8, 1952, Serial No. 270,728

11 Claims. (Cl. 236—35)

This invention relates in general to a system for controlling the temperature of a fluid and more particularly has to do with an improved system for controlling the temperature of a fluid used in a hydraulic transmission.

Hydraulic transmissions have come into wide use for transmitting power from a power source, such as an engine, to a driven member, such as the drive shaft of a vehicle. During the operation of the transmission, that is when it is operative to transmit power from the engine to the drive shaft, the friction between the transmission fluid and the movable elements of the transmission increases the temperature of the fluid. It has been found, that when the temperature of the fluid reaches a point where it exceeds a predetermined value, the efficiency of the transmission is seriously impaired. Therefore, it has become the practice to provide means for cooling the transmission fluid in order to maintain the temperature of the same at a value where it will afford efficient operation of the transmission.

The present invention contemplates and has for one of its objects the provision of a novel and improved system, including a novel control device therefor, for controlling the temperature of a transmission fluid so as to maintain the same at a substantially constant, predetermined value to the end that optimum efficiency of the transmission is more nearly achieved.

To the above end, the present invention contemplates an improved system wherein the transmission fluid is conducted from the transmission through a novel control device that is operative in response to the temperature of the fluid received from the transmission to pass a part or all of the fluid through a heat exchange unit after which the fluid is returned to the transmission. The heat exchange unit includes means for passing a heat transfer medium therethrough that is effective to cool the liquid. The control device is constructed and arranged to operate the means for passing the heat transfer medium through the unit so as to vary the rate of flow of the heat transfer medium as a function of the temperature of the fluid received by the control device from the transmission. Thus, by varying the rate of flow of the heat transfer medium flowing through the heat exchange unit as above set forth, the temperature of the fluid is controlled to the end that it is returned to the transmission within substantially constant predetermined values.

Since under certain operational conditions of the transmission the temperature of the transmission fluid may be increased to a value where it exceeds the capacity of the heat exchange unit to cool the same, the present invention also contemplates, and has for one of its objects, the provision of means whereby a warning signal is given to advise when the fluid temperature has risen to a point where it exceeds the cooling capacity of the heat exchange unit.

To achieve this end, the control device is operative in response to the temperature of the transmission fluid received from the transmission to actuate a switch in an electric circuit to thereby illuminate a warning light.

The above and other objects and advantages of the instant invention will appear more fully hereinafter from a consideration of the following description taken in connection with the accompanying drawings wherein one embodiment of the novel system and control device contemplated herein is shown by way of example.

In the drawings, wherein like reference characters are used to designate like parts, throughout the several views.

Figure 1:
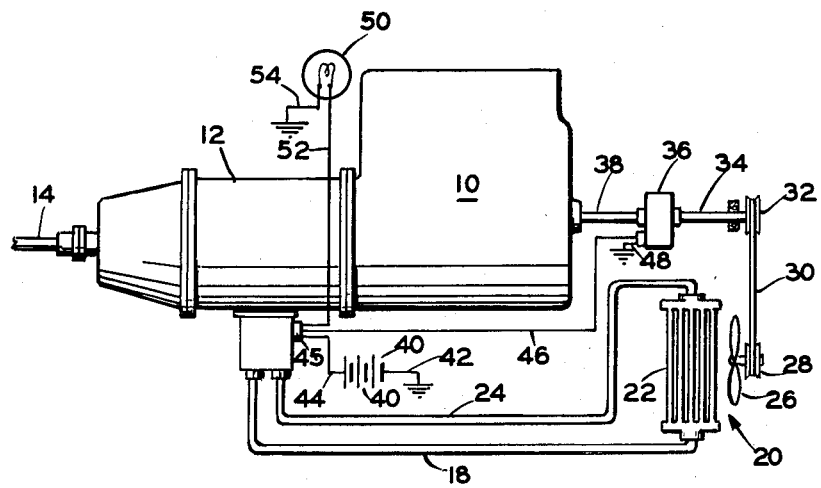
Fig. 1 is a diagrammatic illustration of the instant invention showing the same in association with a hydraulic transmission for transmitting power from an engine to a drive shaft.

Referring now to the drawings and more particularly to Fig. 1, the reference character 10 designates an engine having a hydraulic transmission 12 for transmitting power from the engine to a drive shaft 14. As hereinbefore set forth, when transmission 12 is operating to transmit power from engine 10 to drive shaft 14 the temperature of the fluid used in transmission 12 tends to increase.

The novel system contemplated herein for controlling the temperature of the transmission fluid comprises, in general, a control device 16, which will hereinafter be more fully described, that is adapted to be mounted to transmission 12 and to receive the heated fluid from transmission 12. A conduit 18 conducts the fluid from control device 16 to a suitable heat exchange unit such as radiator 20, that includes a plurality of coils 22 through which the fluid is conducted to be cooled. The cooled fluid is returned to transmission 12 through a return conduit 24 and control device 16.

To provide means for passing and varying the rate of flow of a heat transfer medium, such as air, over and around coils 22, heat exchange unit 20 also includes a fan 26 that is drivingly connected through suitable means such as pulley 28 and belt 30 to a pulley 32 that is fixedly mounted on a rotatably supported shaft 34. Shaft 34, in turn, is connected through a variable speed coupling or eddy-current clutch 36, well known in the art, to a power take-off shaft 38 driven by engine 10.

A source of electrical energy for the operation of clutch 36 is provided by a battery 40 that is connected through an electrical lead 42 to ground and through an electrical lead 44 to an electrical plug connection 45 of control device 16. An electrical lead 46 from plug 45 of control device 16 is connected to clutch 36 which in turn is connected to ground through electrical lead 48. Battery 40 also serves to supply an electrical current to illuminate a warning lamp 50 and to that end lamp 50 is connected through electrical leads 52 and 54 to plug 45 of control device 16 and ground, respectively.

As will hereinafter be more fully set forth, control device 16 is operative in response to the temperature of the fluid received from transmission 12 to establish current flow from battery 40 to clutch 36 to actuate the same so as to vary the speed of shaft 34 and hence fan 26 to the end that the rate of flow of the heat transfer medium through heat exchange unit 20 is varied as a function of the temperature of the fluid received by the control device 16 from transmission 12. Moreover, the control device 16 is also operative in response to the fluid temperature above a predetermined value to electrically connect battery 40 to warning lamp 50 to illuminate the same.

Figure 2:
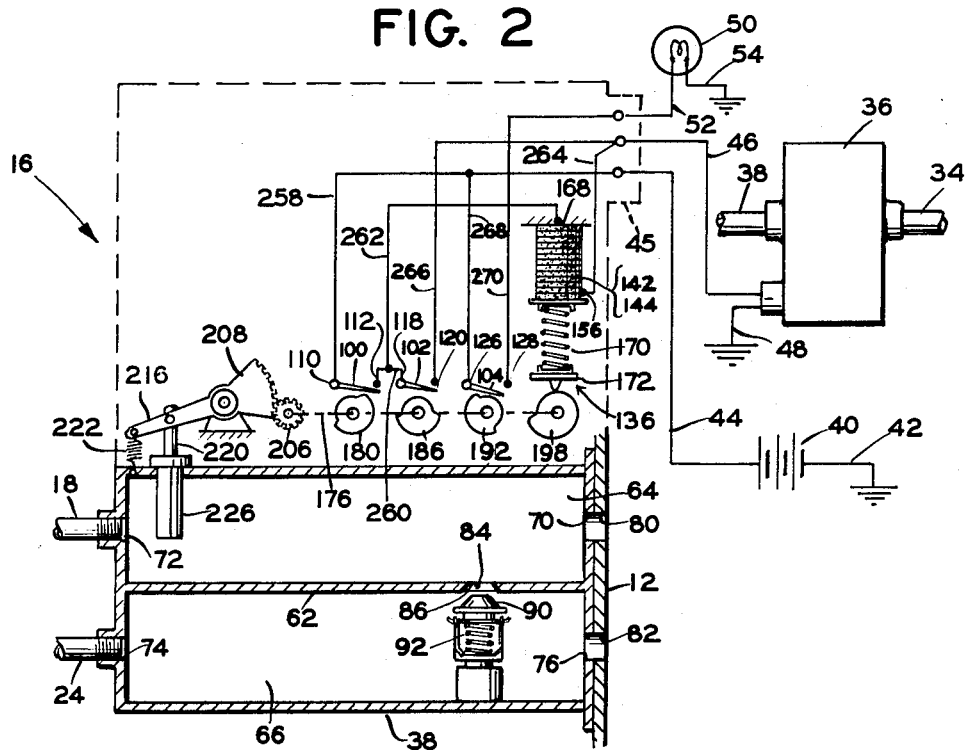
Fig. 2 is a diagrammatic illustration of the novel control device contemplated herein and showing the electric circuitry of the system.
Figure 3:
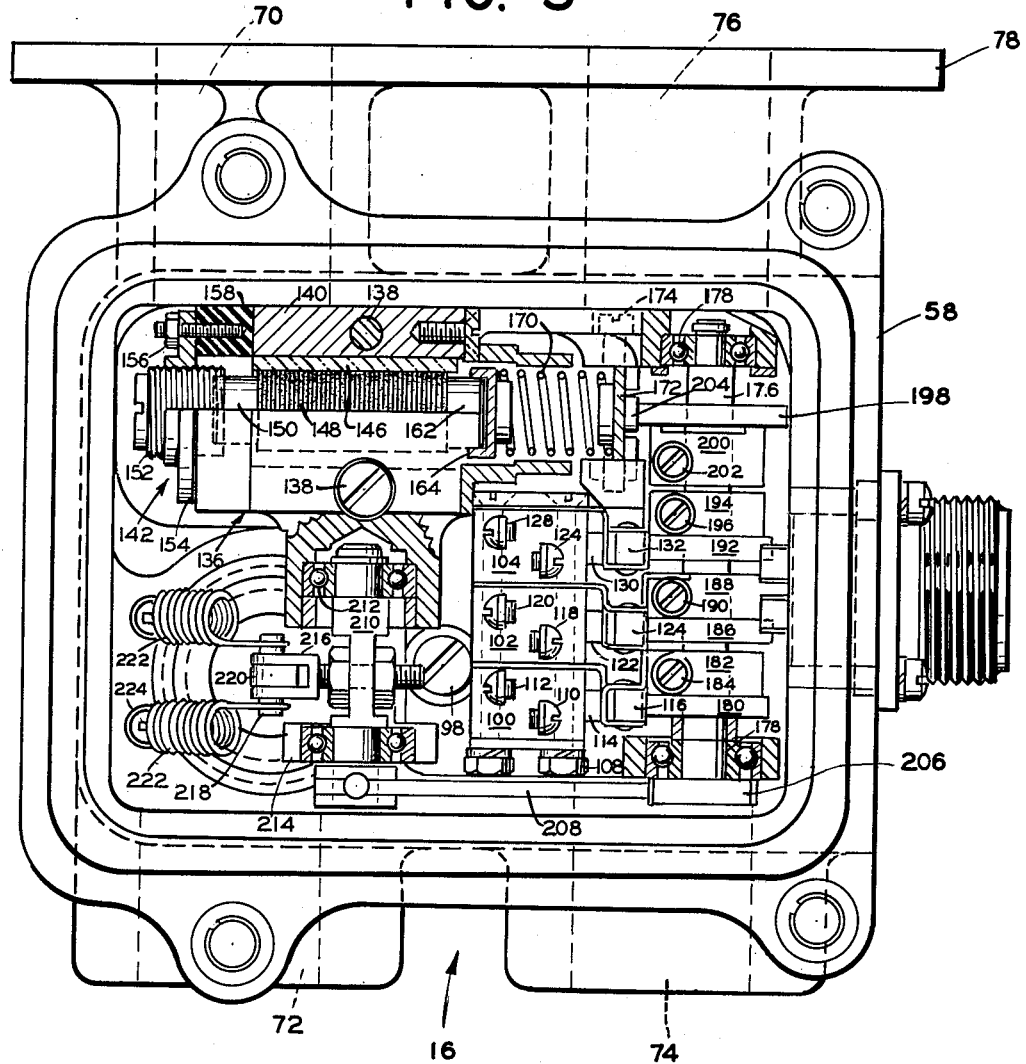
Fig. 3 is a plan view of the control device with its cover removed and showing certain elements of the device partially in section.
Figure 4:
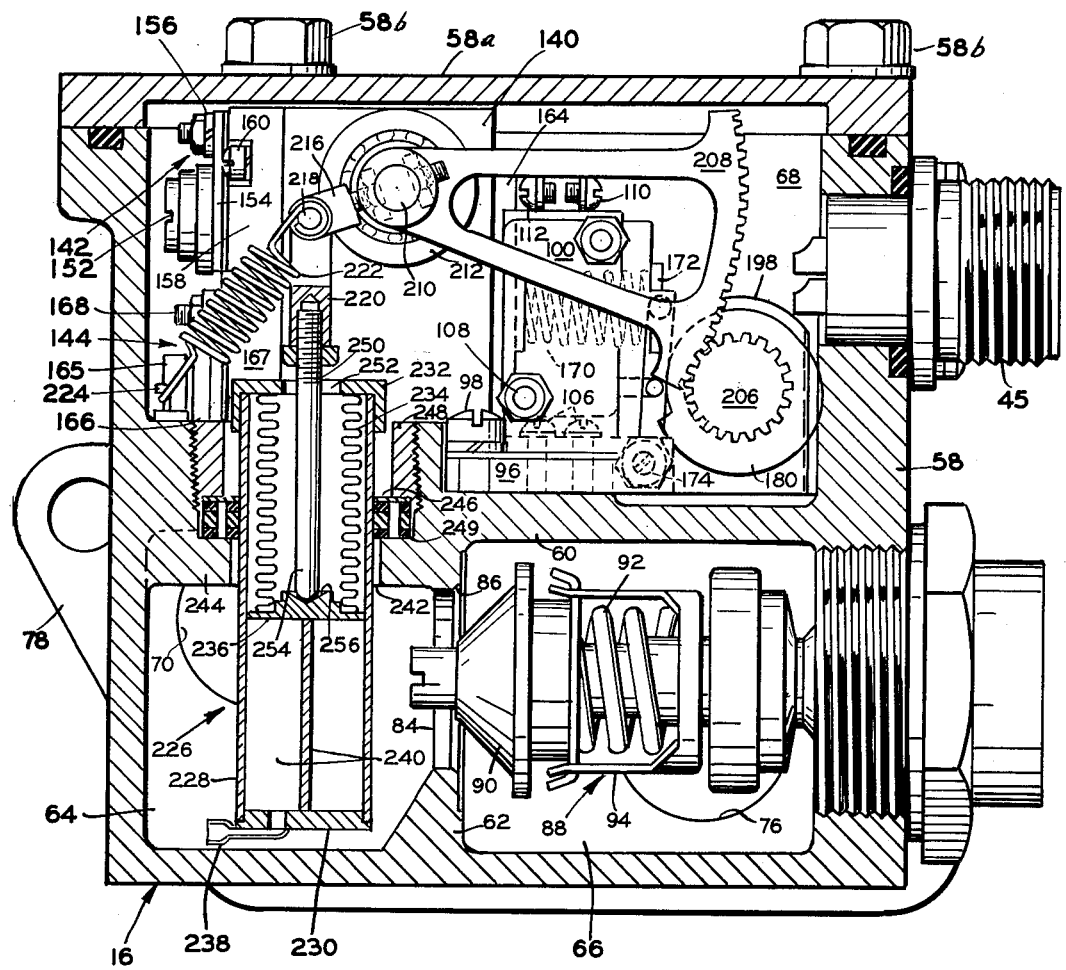
Fig. 4 is a section taken along lines 4—4 of Fig. 3 but showing the elements mounted in the upper portion of the device in side elevation.

As shown more particularly in Figs. 3 and 4, control device 16 comprises a casing 58 including a cover 58a removably secured thereto by bolts 58b. Casing 58 is provided with interior walls 60 and 62 which serve to define chambers 64, 66 and 68 within casing 58. Casing 58 is further provided with inlet and outlet ports 70 and 72 respectively formed at opposite ends of chamber 64, and inlet and outlet ports 74 and 76, respectively, formed at opposite ends of chambers 66. A mounting flange 78 on casing 58 affords means whereby the casing is mounted to the housing of transmission 12 so as to position inlet 70 of chamber 64 and outlet 76 of chamber 66 in registration with suitable openings 80 and 82, respectively (Fig. 2) formed in the housing of transmission 12. The outlet port 72 of chamber 64 and the inlet port 76 of chamber 62 are connected to conduits 18 and 24, respectively. Thus, a first fluid circuit is established that leads from transmission 12, through inlet 70, chamber 64, outlet 72, conduit 18, coils 22 of heat exchange unit 20, conduit 24, inlet port 74, chamber 66 and outlet port 76 to transmission 12.

As shown in Fig. 4, wall 62 is provided with a port 84 that communicates chamber 64 with chamber 66 to thereby establish a second, or by-pass fluid circuit through control device 16. Thus, the by-pass circuit is from transmission 12, through inlet 70 into chamber 64 through port 84 into chamber 66 and through outlet port 76 into transmission 12.

To control flow through the by-pass circuit, in response to the temperature of the transmission fluid in chamber 66, by-pass port 84 is provided with a seat 86 that faces inwardly into chamber 66. A thermostatic and pressure responsive valve unit 88, mounted in the wall of casing 58 to extend into chamber 66, is provided with a conical head 90 that is adapted to sealingly engage valve seat 86 to close communication through by-pass port 84. The valve unit 88 per se forms no part of the instant invention and is procurable on the market. For present purposes, however, the valve unit 88 includes a spring 92 constructed and arranged to bias valve heat 90 in the direction of valve seat 86. The movement of valve head 90 by spring 92 is controlled by a thermo-responsive element 94 shown in Fig. 4 to the end that in response to temperatures in excess of a predetermined value within chamber 66, element 94 expands or increases in length, to permit spring 92 to move valve head 90 in the direction of seat 86 to thereby close off port 84. At a predetermined value valve head 90 engages seat 86 to completely close by-pass port 84 after which the transmission fluid will pass only through the first fluid circuit hereinbefore described. In the event the pressure of the fluid in chamber 64 exceeds the biasing force of spring 92, valve head 90 will be moved off valve seat 86 and the excessive pressure in chamber 64 will be relieved through by-pass port 84.

As hereinbefore set forth, control device 16 also serves to control the delivery of electrical power from battery 40 to eddy current clutch 36 and warning lamp 50. Referring now to Figs. 2, 3 and 4, a mounting block 96 is secured to wall 60 by suitable fastening means such as a bolt 98 so as to be positioned in chamber 68. Electrical contact switches 100, 102 and 104 are mounted to block 96 by screws 106 and to each other by bolts 108 which pass through the housings of the switches.

Switches 100, 102 and 104 may be of any type well known in the art having normally open contacts that are moved into a closed position to pass current through the switch. As shown in Fig. 3, switch 100 is provided with terminals 110 and 112 and a plunger 114 that is moved inwardly by roller 116 to close switch 100 and permit current to pass between the terminals 110, and 112 thereof. Switch 102 is similarly constructed having terminals 118 and 120, plunger 122 and roller 124 and switch 104 is provided with terminals 126 and 128, plunger 130 and roller 132.

A conventional carbon pile regulator 136 is mounted within chamber 68 by bolts 138 which pass through suitable openings in housing 140 of regulator 136 and engage suitably threaded sockets (not shown) formed in wall 60. Regulator 136 includes two carbon pile variable resistance units 142 and 144 that are of similar construction and which are mounted one over the other in housing 140. In Fig. 3, carbon pile resistance unit 142 is shown partially in section and comprises an insulating sleeve 146 mounted within housing 140 and in which is positioned a plurality of cylindrical carbon discs 148. At one end, carbon discs 148 engage a contact button 150 which in turn is engaged by an adjustment plug 152 threadedly received in an end plate 154. End plate 154 is secured by a bolt 156 to an insulating collar 158 that is mounted to housing 140 by screws 160. Button 150, plug 152, end plate 154 and bolt 156 are fabricated from a material having good electricity conducting characteristics to the end that bolt 156 is electrically connected to carbon discs 148 and therefore serves as a terminal for resistance unit 142. The other end of carbon discs 148 engage a contact button 162 which in turn engages the upper end of bridge 164.

Resistance unit 144 is similarly constructed and includes a plug 165 mounted in an end plate 166 secured to an insulating collar 167 by a bolt 168. As in the instance of resistance unit 142 where bolt 156 serves as a terminal, in variable resistance unit 144, bolt 168 also serves as a terminal. Resistance unit 144 also includes a contact button (not shown) that engages the lower end of bridge 164. Bridge 164 is fabricated from an electro-conductive material to the end that resistance units 142 and 144 are connected in series.

To maintain bridge 164 in engagement with their respective contact buttons, a spring 170 is operatively positioned between bridge 164 and the free end of a lever 172. The opposite end of lever 172 is pivoted on a pin 174 mounted in housing 140. As will hereinafter be set forth, means are provided to move lever 172 in the direction of bridge 164 so as to increase the loading of spring 170 or bridge 164 and hence on carbon discs 148 of resistance unit 142 and the carbon discs (not shown) of resistance unit 144. Due to this loading, the carbon discs of resistance units 142 and 144 will be compressed and therefore offer less resistance to current flow through regulator 136.

To provide means whereby switches 100, 102 and 104 and regulator 136 are operated, a shaft 176 is rotatably supported by bearing 178 mounted in chamber 68. A cam 180 carried by a collar 182 is secured to shaft 176 by a bolt 184 and positioned on the shaft so as to have cam 180 engage roller 116 of switch 100. A second cam 186 is secured by its collar 188 and bolt 190 to shaft 176 so as to engage roller 124 of switch 102. A third cam 192 is similarly secured by its collar 194 and bolt 196 to shaft 176 to engage roller 132 of switch 104 and a fourth cam 198 secured to shaft 176 by its collar 200 and bolt 202 is positioned to engage an abutment 204 formed on lever 172. Abutment 204 may be formed of an insulating material or may be insulated from lever 172 by any suitable means.

To rotate shaft 176 in a counterclockwise direction through a predetermined angle of revolution, a pinion 206 fixedly mounted to the end of shaft 176, engages a sector gear 208 that is mounted on a shaft 210 which in turn is rotatably supported in bearings 212 carried by housing 140 and a bracket 214. Shaft 210 is provided with an actuating lever 216 that is pivotally connected by a pin 218 to the upper end of an operating rod 220. Springs 222 connected between pin 218 and suitable anchoring means 224 mounted in wall 60 act through lever 216 to normally bias sector gear 208 in a counterclockwise direction into a starting position such as shown in Fig. 4.

To actuate sector gear 208 in response to the temperature of the oil received in chamber 64 from transmission 12, control device 16 is provided with a temperature responsive power element 226. Power element 226 comprises a cylindrical sleeve 228 closed at the lower end by an end wall 230 and having a cap 232 sealingly secured to the other end thereof. A bellows 234 sealingly secured at its upper end to the underside of cap 232 and closed at its lower end by end plate 236 extends into sleeve 228. End wall 230 is provided with a suitable filler assembly 238 to the end that a liquid having a large positive temperature coefficient of expansion, such as pentachlorethane, may be introduced into the interior of sleeve 228, to completely fill the same and thereby completely immerse bellows 234 in the liquid. Heat conducting vanes 240 secured to end wall 230 and contacting sleeve 228 at their outer extremities afford means whereby heat from sleeve 228 may be rapidly conducted from sleeve 228 to the liquid.

Power element 226 is mounted within casing 58 so as to have its lower portion disposed in chamber 64 and the upper portion thereof disposed in chamber 68. To this end, wall 60 is provided with a through opening 242 between chambers 64 and 68 that is adapted to receive sleeve 228. The upper end portion of opening 242 is somewhat greater in diameter than the lower portion thereof to the end that an outstanding flange 244 is formed at the lower end thereof. Sleeve 228 is provided with a mounting flange 246 that engages flange 244 when sleeve 228 is positioned in opening 242. The portion of wall 60 defining the upper end of opening 242 is internally threaded to receive an externally threaded collar 248. Collar 248 serves to clamp flange 246 into engagement with flange 244. Suitable sealing means 249 are interposed between flanges 244 and 246 to seal chamber 68 from chamber 64.

Operating rod 220 is provided with an adjustable extension 250 that extends through a slot 252 in cap 232 and the conically formed lower extremity 254 of rod 220 engages a recess 256 formed in the inner side of end wall 230. By virtue of extension 250 the length of operating rod 220 may be adjusted so that the end 254 thereof is brought into bearing contact with recess 256 when the sector gear 208 is in its starting position as shown in Fig. 3.

Due to the foregoing construction and arrangement, when sleeve 228 is exposed to the heated fluid entering chamber 64, the heat of the fluid will be conducted through sleeve 228 and vanes 240 to the liquid within sleeve 228. As the liquid is heated it expands, thereby compressing bellows 234 and moving plate 236 upwardly. The upward movement of plate 236 moves rod 220 upwardly thereby rotating lever arm 216, and hence shaft 210, in a clockwise direction against the biasing effect of springs 222. The clockwise rotation of shaft 210 rotates sector gear 208 in a clockwise direction to impart a counterclockwise rotation to gear 206 and hence shaft 176. Cams 180, 186, 192 and 198 are fixedly secured to shaft 176 and therefore rotate in a counterclockwise direction therewith.

Cam 180 is so designed that upon a first angular displacement of shaft 176 in a counterclockwise direction from the starting position thereof shown in Fig. 3, cam 180 acting through roller 116 moves plunger 114 inwardly thereby closing switch 100. Cam 186 is designed so that upon the continued counterclockwise rotation of shaft 176 when shaft 176 reaches a second predetermined angular position relative to the starting point thereof, cam 186 acting through roller 124 moves plunger 122 inwardly thereby closing switch 102. Cam 192 is designed to act through roller 132 to move plunger 130 inwardly and close switch 104 when shaft 176 reaches a third predetermined angular displacement relative to its starting point, upon the continued rotation of the shaft in a counterclockwise direction. Cam 198 is so designed that concurrently with the closing of switch 100, i. e., when shaft 176 reaches the first position above set forth, cam 198 begins to move lever 172 inwardly to compress spring 170 and thereby increase the spring loading on resistance units 142 and 144 of regulator 136. As shaft 176 continues to rotate toward the second predetermined position thereof, cam 198 continues to move lever 172 inwardly thereby increasing the load impressed by spring 170 on resistance units 142 and 144. When shaft 176 reaches the second predetermined position thereof, i. e., when switch 102 closes, cam 198 ceases to move lever 172 inwardly, but maintains the lever 172 in that position during any further counterclockwise rotation of shaft 176. Thus, upon rotation of shaft 176 in a counterclockwise direction from its starting point, cams 180, 186 and 192 operate to close switches 100, 102 and 104 in sequence as shaft 176 reaches first, second and third predetermined positions relative to its starting point, and to maintain the switches in closed position after they have been closed during the continued counterclockwise rotation of shaft 176. Cam 198 operates to increase the biasing effect of spring 170 on regulator 136 from a minimum value to a maximum value during rotation of shaft 176 from its first to its second predetermined position and thereafter operates to maintain the maximum biasing effect of spring 170 on regulator 136 during any further counterclockwise rotation of shaft 176.

Reference is made now to Fig. 2, wherein control device 16 is shown schematically, and wherein is also shown the electrical circuits within control device 16 and between control device 16 and the clutch 36, battery 40 and warning lamp 50. Battery 40 is connected to control device 16 by means of an electrical conductor, or lead 44 which runs to electrical connection 45 of the control device. Within plug 45, lead 44 connects with a lead 258 which runs to terminal 110 of switch 100. Terminal 112 of switch 100 is connected by lead 260 to terminal 118 of switch 102 and lead 262 connects lead 260 to terminal 168 of regulator 136. A lead 264 connects terminal 156 of regulator 136 to plug 45 wherein lead 264 is connected to lead 46 of clutch 36. Clutch 36 is connected to ground by lead 48. Thus, a first electrical circuit between battery 40 and clutch 36 is established when switch 100 is closed by its cam 180 comprising battery 40, leads 44 and 258, switch 100, leads 260 and 262, regulator 136, leads 264 and 46 to clutch 36 and through lead 48 to ground. Terminal 120 of switch 102 is connected by a lead 266 with plug 45 and within plug 45 to lead 46 from clutch 36. Thus, when switch 102 is closed, a second electrical circuit between battery 40 and clutch 36 is established comprising leads 44 and 258, switch 100, lead 260, switch 102 and leads 266 and 46 to clutch 36. In this second circuit, regulator 136 is shorted to the end that the full voltage of battery 40 is conducted through the path aforesaid to clutch 36. Terminal 126 of switch 104 is connected by a lead 268 to lead 258 and terminal 128 thereof is connected through a lead 270 and plug 45 with lead 52 of warning lamp 50. Thus, when switch 104 closes, electrical energy from battery 40 to lamp 50 is delivered through a third electrical circuit comprising lead 44, plug 45, leads 258 and 268, switch 104, lead 270, plug 45 and lead 52 to lamp 50 and thence through lead 54 to ground.

Having thus described the details of construction and arrangement of the instant invention, it will be apparent to one skilled in the art that when engine 10 is operating and transmission 12 actuated to transmit power from engine 10 to shaft 14, suitable pumping means in transmission 12 (not shown) will pump the transmission fluid through the outlet 80 of transmission 12 and inlet 70 of control device 16 into chamber 64 of control device 16. Since under the initial operation of transmission 12 the fluid is relatively cool thermo-pressure responsive valve means 88 remains open and the fluid passes, in part, from chamber 64 through port 84, chamber 66, and outlet 76 of control device 16 into and through inlet 82 of transmission 12. The remaining portion of the transmission fluid passes from chamber 64 through outlet 72 of con- trol device 16 and conduit 18 to heat exchange unit 20, where it passes through the coils 22 thereof and is returned through conduit 24, inlet 74, chamber 66 and outlet 76 of control device 16 and inlet 82 into transmission 12. Since at this time the temperature of the transmission fluid is at a relative low value, power element 226 is not actuated thereby. Therefore, switch 100 remains open and although shaft 38 is being rotated by engine 10, clutch 36 is inactive. Hence, no power from shaft 38 is transmitted to shaft 34 and fan 26 is stationary.

When due to the operation of transmission 12, the temperature of the transmission fluid entering chamber 64 reaches a first preselected value, for example about 100° F., unit 226 is actuated and plate 236 begins to move upwardly thus moving rod 220 upwardly and rotating gears 208 and 206, as hereinbefore set forth.

When the temperature of the fluid reaches a second preselected value, for example 135° F., power element 226 has been actuated to a point where shaft 176 has been rotated to the first predetermined position thereof where cam 180 closes switch 100. Upon the closing of switch 100, current flows from battery 40 through conductor or lead 44 to plug 45 of control device 16 where lead 44 is connected to lead 258. The current, therefore, flows through lead 258, switch 100, leads 260 and 262, regulator 136, and lead 264 to plug 45 where lead 264 is connected to lead 46 of clutch 36. Clutch 36 is thereby actuated and power is transmitted from shaft 38 through clutch 36 to shaft 34. The rotation of shaft 34, in turn, drives pulley 32, belt 30 and pulley 28 to the end that fan 26 is rotated and a heat transfer medium, such as air, is passed through heat exchange unit 20. As hereinbefore set forth, when shaft 176 is in its first predetermined position, cam 198 has just begun to move lever 172 so as to increase the loading of spring 170 on the carbon discs of resistance units 142 and 144 of regulator 136. Therefore, the resistance of units 142 and 144 is at a maximum and the current being delivered to clutch 36 is at a minimum. It is manifest, therefore, that clutch 36 is effective to transmit only a relative low value of power from shaft 38 to shaft 34. Hence, fan 26 is rotated at a relatively low speed and the rate of flow of the heat transfer medium through heat exchange unit 20 is also at a relatively low value.

If due to the operation of transmission 12 the temperature of the transmission fluid entering chamber 64 continues to increase, power element 226 in response to the increasing temperature continues to move rod 220 upwardly to the end that gears 208 and 206 continue to rotate shaft 176 in a counterclockwise direction. Cam 198, therefore, continues to move lever 172 inwardly thereby increasing the loading of the carbon discs of resistance units 142 and 144 by spring 170 and reducing the resistance of regulator 136 to current flow to clutch 36. Clutch 36 is therefore actuated to transmit more power from shaft 38 to shaft 34 and the speed of fan 26 is increased to increase the rate of flow of the heat transfer medium through heat exchange unit 20 to the end the heat exchange unit 20 becomes more effective to cool the transmission fluid passing through the coils 22 thereof.

In the event the temperature of the transmission fluid entering chamber 64 increases to a third preselected value, for example 250° F., power element 226 in response to this temperature value will have moved shaft 176 to its second predetermined position where cam 182 closes switch 102. When switch 102 is closed current flows from battery lead 44 through plug 45, lead 258, switch 100, lead 260, switch 102 and lead 266 to plug 45. In plug 45, lead 266 connects with lead 46 of clutch 36. Due to this circuit, clutch 36 receives the full voltage of battery 210 and therefore is operated at its maximum efficiency to transmit power from shaft 38 to shaft 34. Fan 26 is thereby rotated at its maximum velocity and the rate of flow of the heat transfer medium through heat exchange unit 20 is at its maximum value.

Should the temperature of the transmission fluid entering chamber 64 increase above the third preselected value, to a fourth preselected value, for example 285° F., power element 226 will move shaft 176 to the third predetermined position thereof and cam 192 will close switch 104. Therefore, current will flow from lead 258 through lead 268, switch 104 and lead 270 to plug 45 where lead 270 connects with lead 52 of warning lamp 50. Warning lamp 50 will therefore be illuminated to indicate to the operator of the engine that the cooling capacity of the system has been exceeded.

During the foregoing operation of the power element 226 in response to the temperature of the transmission fluid in chamber 64, valve assembly 88 operates in response to the temperature of the transmission fluid in chamber 66. Thus, when the temperature of the fluid in chamber 66 reaches a first preselected value, for example 100° F., valve lead 90 starts to move toward seat 86 closing off port 84 and directing a greater portion of the transmission fluid through the heat exchange unit 20. When the temperature of the fluid in chamber 66 reaches a second preselected value, for example 185° F., valve head 90 engages seat 86 thereby completely closing bypass port 84. Thereafter, the transmission fluid is directed solely through the heat exchange unit 20.

In response to decreasing temperatures the sequence of operation above set forth is reversed. Thus, as the temperature of the fluid in chamber 64 decreases, pressure element 226 contracts and springs 222 rotate gears 208 and 206 so as to move shaft 176 in a clockwise direction. When the temperature of the fluid in chamber 64 reaches a value just below the fourth preselected value, cam 192 permits switch 104 to open and extinguish lamp 50. As the temperature reaches a point just below the third preselected value, cam 186 permits switch 102 to open and current therefore flows to clutch 36 through the circuit which includes regulator 136. As the temperature of the transmission fluid continues to be lowered, cam 198 continues to decrease the biasing effect of spring 170 on resistance units 142 and 144 thus increasing the resistance in the circuit between battery 40 and clutch 36 to the end the speed of fan 26 is reduced and the rate of flow of the heat transfer medium passing through heat exchange unit 20 is reduced. When the temperature reaches a value below the second preselected value, cam 180 permits switch 100 to open and clutch 36 then becomes inactive and fan 26 comes to rest.

Valve assembly 88 also operates in the reverse of the sequence above set forth in response to lowering values of the fluid in chamber 61. Thus, valve assembly 88 opens port 84 when the temperature of the fluid falls below the second preselected value and continues to open port 84 until full flow is had therethrough when the temperature reaches a value just below the first preselected value.

Having thus described the details of construction and operation of the instant invention it will be apparent to one skilled in the art that the various objects of the instant invention, hereinbefore set forth, have been achieved.

Although only one embodiment of the invention has been illustrated and described, various changes in the form and relative arrangement of the parts which will now appear to those skilled in the art, may be made without departing from the scope of the invention.

What is claimed is:

1. The combination with an engine having a hydraulic transmission, of a system for controlling the temperature of the fluid used in the transmission, said system comprising a control device having a first chamber to receive the heated fluid from the transmission, a second chamber to deliver the fluid to the transmission, and a third chamber, first second and third normally open electrical switches and a variable resistance element in said third chamber, a cam shaft in said third chamber, first, second, third and fourth cams mounted on said cam shaft for rotation therewith, said first, second and third cams being constructed and arranged to sequentially close said first, second and third electrical switches, respectively, upon rotation of said cam shaft in one direction from a starting position to first, second and third predetermined positions, said fourth cam being constructed and arranged to vary the resistance of said element from a maximum to a minimum value as said cam shaft rotates from said first to said second predetermined positions and to maintain said resistance at minimum value during continued rotation of said cam shaft in said one direction, a first gear secured to said cam shaft, a gear shaft rotatably mounted in said third chamber, a second gear secured to said gear shaft and engaged with said first gear, a lever secured to said gear shaft, said lever, second and first gears being effective to rotate said cam shaft upon movement of said lever, resilient means biasing said lever in one direction to position said cam shaft in the starting position thereof, a thermo responsive power element mounted between said first and third chambers comprising a cylindrical sleeve having a wall closing one end and a cap closing the other end thereof, said cap being positioned in said third chamber, a bellows sealingly secured at one end to the inner side of said cap and positioned within said sleeve, a plate closing the inner end of said bellows, a liquid within said sleeve having a large positive temperature coefficient of expansion, said liquid being effective in response to the temperature of the fluid in said first chamber above a preselected value to expand and compress said bellows thereby moving said plate within said sleeve, an opening in said cap communicating with the interior of said bellows, an operating rod connected at one end to said lever and extending through the opening in said cap and engaged at the other end thereof with said plate whereby movement of said plate upon compression of said bellows is transmitted through said rod to said lever, a heat exchange unit including an inlet, an outlet and cooling coils connected between said inlet and outlet, conduit means connecting said first chamber to said inlet and said second chamber to said outlet, said heat exchange unit including a fan passing a heat transfer medium through said unit and over and around the coils thereof, a first shaft drivingly connected to the engine, a second shaft drivingly connected to said fan, an eddy current clutch transmitting power between said first and second shafts, a warning lamp, a source of electrical energy, a first electrical circuit between said electrical power source and said eddy current clutch including said first electrical switch and said variable resistance element connected in series, a second electrical circuit between said power source and said clutch including said first and second electrical switches connected in series, a third electrical circuit between said power source and said warning lamp, a by-pass port between said first and second chambers, and a thermo responsive valve in said second chamber and responsive to the temperature of the fluid in said second chamber to control flow through said by-pass port, said power element being effective in response to a first preselected value of the temperature of the fluid in said first chamber to compress said bellows and move said plate, rod levers, second and first gears, to rotate said cam shaft to the first predetermined position thereof where said first cam closes said first switch to thereby connect said source of electrical energy to said clutch transmits a relative low value of power from first to said second shafts and said fan is rotated at a relatively low speed to pass a relatively low flow of heat transfer medium through said heat exchange unit to cool the fluid passing through the coils thereof, said power element being effective in response to increasing values of the temperature of the fluid in said first chamber above said first preselected value and below a second preselected value to rotate said cam shaft as aforesaid whereby said fourth cam decreases the resistance of said variable resistance element in said first circuit to thereby effect the operation of said clutch to increase the power transmitted from said first shaft to said second shaft and thereby increase the speed of rotation of said fan whereby the rate of flow of the heat transfer medium through said heat exchange unit is increased, said power element being effective in response to a second preselected value of the temperature of the fluid in said first chamber to rotate said cam shaft as aforesaid to the second predetermined position thereof where said second cam closes said second switch to thereby connect said source of electrical energy to said clutch through said second circuit whereby said clutch is operated to transmit a relatively high value of power from said first shaft to said second shaft and said fan is rotated at a relatively high speed to pass a relatively high flow of heat transfer medium through said heat exchange unit, said power element being effective in response to a third preselected value of the temperature of the fluid in the first chamber to rotate said cam shaft as aforesaid whereby said third cam closes said third switch to thereby connect said source of electrical energy to said warning lamp to illuminate the same.

2. The combination with an engine having a hydraulic transmission of a system for controlling the temperature of the fluid used in the transmission, said system comprising a control device having a first chamber to receive the fluid from the transmission, a second chamber to deliver the fluid from said control device to the transmission, and a third chamber, first, second and third normally open electrical switches and a variable resistance element in said third chamber, a cam shaft rotatably supported in said third chamber, first, second, third and fourth cams mounted on said cam shaft for rotation therewith, said first, second and third cams being constructed and arranged to sequentially close said first, second and third switches upon rotation of said cam shaft in one direction from a starting position to first, second and third predetermined positions relative to said starting position, said fourth cam being constructed and arranged to vary the resistance of said variable resistance element during rotation of said cam shaft from the first to the second predetermined position thereof, mechanical means connected to said cam shaft to rotate the same, temperature responsive means responsive to the variations in the temperature of the fluid in said first chamber to operate said mechanical means to rotate said cam shaft from the starting position to the first, second and third predetermined positions thereof, a heat exchange unit including an inlet connected to said first chamber and an outlet connected to said second chamber, electrically operated means for passing a heat transfer medium through said heat exchange unit, a warning lamp, a source of electrical energy, electrical circuit means connecting said source of electrical energy to said electrically operated means and said warning lamp through said first, second and third switches and said variable resistance element whereby said electrically operated means is operated to vary the rate of flow of heat transfer medium through said heat exchange unit, and said warning lamp is illuminated as said first, second and third switches and variable resistance element are operated by their respective cams upon rotation of said cam shaft to the first, second and third predetermined positions thereof by said temperature responsive means.

3. The combination with an engine having a hydraulic transmission of a system for controlling the temperature of the fluid used in the transmission, said system comprising a control device having a first chamber to receive fluid from the transmission, a second chamber to deliver fluid from said control device to the transmission, a heat exchange unit, conduit means delivering the fluid from said first chamber to said heat exchange unit and from said heat exchange unit to said second chamber, electrically operated means for passing a heat transfer medium through said heat exchange unit to vary the temperature of the fluid therein, a source of electrical energy, circuits electrically connecting the source of electrical energy to the electrically operated means, a first circuit serving to provide a low current flow to the electrically operated means, a second circuit serving to provide an increased current flow to the electrically operated means, an operator-warning signal lamp, a third circuit serving to illuminate the latter, a normally open switch for closing each circuit, rotatable cam means for closing the switches in sequence to energize the circuits in order upon rotation of the cam means, control means responsive to temperature increases in the fluid of the first chamber, and means operatively connected to the latter means serving to rotate the cam means in a ratio proportionate to the temperature increases.

4. The combination with an engine having a hydraulic transmission of a system for controlling the temperature of the fluid used in the transmission, said system comprising a control device having a first chamber to receive fluid from the transmission, a second chamber to deliver fluid from said control device to the transmission, a heat exchange unit, conduit means delivering the fluid from said first chamber to said heat exchange unit and from said heat exchange unit to said second chamber, means for passing a heat transfer medium through said heat exchange unit to vary the temperature of the fluid therein, means for varying the rate of flow of the heat transfer medium in direct ratio to temperature change in the fluid of the first chamber, control means responsive to temperature changes in the fluid of the first chamber controlling the operation of the latter means, and operator-warning signal means operable by the control means upon the latter responding to a predetermined excessive temperature.

5. In a system for controlling the temperature of a fluid the combination of a control device having a first chamber to receive said fluid and a second chamber to discharge said fluid, a heat exchange unit connected between said first and second chambers, fan means to pass a heat transfer medium through said heat exchange unit to vary the temperature of the fluid therein, means for rotating said fan means including an electrically operated variable speed coupling, said coupling being effective in response to an electric current delivered thereto to vary the speed of rotation of said fan means and thereby vary the rate of flow of the heat transfer medium through said heat exchange unit, a source of electrical energy, a first circuit including a first normally open electrical switch and an electric control means connected in series between said source of electrical energy and said coupling, a second electrical circuit including said first switch and a second normally open switch connected in series between said source of electrical energy and said coupling, cam means individual to each of said switches and said control means, and means responsive to the temperature of the fluid in said first chamber to move said cam means to first and second predetermined positions, said cam means being constructed and arranged to close said first switch at said first predetermined position to deliver a relatively low electric current through said first electrical circuit whereby said coupling is effective to rotate said fan means at a substantially constant low velocity, to actuate said control means so as to increase the current in said first electrical circuit during movement of said cam means between the first and second predetermined positions thereof whereby said coupling is effective to increase the speed of the fan means, and to close said second switch at the second predetermined position and deliver a relatively high current through said second circuit whereby said fan means is rotated at a substantially constant high velocity.

6. In a system for controlling the temperature of a fluid the combination of a control device having a first chamber to receive said fluid and a second chamber to discharge said fluid, a heat exchange unit connected between said first and second chambers, fan means to pass a heat transfer medium through said heat exchange unit to vary the temperature of the fluid therein, means for rotating said fan means including an electrically operated variable speed coupling, said coupling being effective in response to an electric current delivered thereto to vary the speed of rotation of said fan means and thereby vary the rate of flow of the heat transfer medium through said heat exchange unit, a source of electrical energy, a first normally open electrical circuit connected between said source of electrical energy and said coupling and including means for varying the current delivered to said coupling, a second normally open electrical circuit connected between said source of electrical energy and said coupling and shunting said means for varying the current in said first electrical current whereby a substantially constant current is delivered to said coupling, means responsive to the temperature of the fluid in said first chamber to sequentially close said first and second electrical circuits whereby the rotational speed of said fan means is varied as a function of the temperature in said first chamber, a third normally open electrical circuit connected between said source of electrical energy and a warning signal lamp, and said temperature responsive means operatively associated with the signal lamp circuit so as to close the latter upon responding to a temperature exceeding that required to close the second circuit.

7. A control device for controlling the flow of electrical energy from a source thereof to an electrically operated mechanism in response to variations in temperature of a fluid, said device comprising a pair of normally open electrical switches, a variable resistance device, a first electrical circuit between the source of electrical energy and the mechanism including one of said switches and said variable resistance device connected in series, a second electrical circuit between said source of electrical energy and said mechanism including said pair of switches connected in series, a cam shaft having a cam individual to each of said switches and said variable resistance device, said cams being constructed and arranged to sequentially close said switches and concurrently vary the resistance of said device upon rotation of said cam shaft, a chamber containing a fluid having a large positive temperature coefficient of expansion, and means operable in response to the expansion and contraction of said fluid in response to the temperature variation thereof and connected to said cam shaft to rotate said cam shaft to sequentially close said switches and concurrently vary the resistance of said device whereby the voltage of the electrical energy in said first and second circuits is varied as a function of the expansion and contraction of said liquid.

8. In combination a source of electrical energy, a pair of normally open electrical switches, a variable resistance device, a first electrical circuit including said source of electrical energy, one of said switches, and said device connected in series; a second electrical circuit including said source of electrical energy and said pair of switches connected in series, a cam shaft having a cam individual to each of said switches and said device, said cams being constructed and arranged to sequentially close said switches and to vary the resistance of said device between the sequential closing of said switches to thereby sequentially establish current flow through said first and second circuits and to vary the current flow upon rotation of said cam shaft; and means for rotating said cam shaft.

9. A control device for controlling the current delivered from a source of electrical energy to an operative mechanism in response to variations in the temperature of a fluid within the control device, said control device comprising a casing having a first chamber to receive the fluid, a second chamber, first and second normally open electrical switches and a variable resistance device in said second chamber, a cam shaft rotatably mounted in said second chamber, first and second cams mounted on said cam shaft for rotation therewith and constructed and arranged to sequentially close said first and second switches, respectively, upon rotation of said cam shaft in one direction from a predetermined starting position to first and second predetermined positions of said cam shaft, a third cam mounted on said cam shaft for rotation therewith, and constructed and arranged to decrease the resistance of said device upon rotation of said cam shaft from the first to the second predetermined position thereof, a pinion fixedly mounted to said cam shaft, a gear shaft rotatably supported in said second chamber, a sector gear fixedly mounted on said gear shaft and engaging said pinion, a lever fixedly mounted on said gear shaft, said lever, sector gear and pinion effective to rotate said cam shaft in response to movement of said lever, resilient means biasing said lever in a direction to position said cam shaft in the predetermined starting position thereof, a temperature responsive power element mounted between and partially disposed in said first and second chambers, said power element comprising a sleeve having a wall closing one end and a cap closing the opposite end thereof, said cap positioned in said second chamber, a bellows sealingly secured at one end to the inner side of said cap and positioned in said sleeve, a plate closing the opposite end of said bellows, a liquid having a large positive temperature coefficient of expansion in said sleeve and surrounding said bellows, said liquid effective in response to temperature variations of the fluid in said first chamber above a preselected value to compress said bellows and move said plate within said sleeve, an opening in said cap, an operating rod connected at one end to said lever and extending through the opening in said cap into the interior of said bellows and engaged with said plate, said rod transmitting movement of said plate to said lever whereby said lever is moved against the bias of said resilient means, a first electrical circuit between said source of electrical energy and said operative mechanism including said first switch and said variable resistance device connected in series, and a second electrical circuit between said source of electrical energy and said operative mechanism including said first and second switches connected in series, said power element effective in response to increasing values of the temperature of the fluid in said first chamber above the preselected value to rotate said cam shaft to the first and second predetermined positions thereof, said first cam effective at the first predetermined position of said cam shaft to close said first switch to thereby deliver a relatively low current through said first electrical circuit to said operative mechanism, said third cam effective between the first and second predetermined position of said cam shaft to decrease the resistance of said device to thereby deliver an increasing current through said first electrical circuit to said operative mechanism, and said second cam effective at the second predetermined position of said cam shaft to close said second switch to thereby deliver a relatively high current through said second electrical circuit to said operative mechanism.

10. A control device for controlling the current delivered from a source of electrical energy to an operative mechanism in response to variations in the temperature of a fluid within the control device, said control device comprising a casing having a first chamber to receive the fluid, a second chamber, first and second normally open electrical switches and a variable resistance device in said second chamber, a cam shaft rotatably mounted in said second chamber, first and second cams mounted on said cam shaft for rotation therewith and constructed and arranged to sequentially close said first and second switches, respectively, upon rotation of said cam shaft in one direction from a predetermined starting position to first and second predetermined positions of said cam shaft, a third cam mounted on said cam shaft for rotation therewith and constructed and arranged to decrease the resistance of said device upon rotation of said cam shaft from the first to the second predetermined position thereof, a pinion fixedly mounted to said cam shaft, a gear shaft rotatably supported in said second chamber, a sector gear fixedly mounted on said gear shaft and engaging said pinion, a lever fixedly mounted on said gear shaft, said lever, sector gear and pinion effective to rotate said cam shaft in response to movement of said lever, resilient means biasing said lever in a direction to position said cam shaft in the predetermined starting position thereof, a first electrical circuit connecting said source of electrical energy to said operative mechanism including said first switch and said variable resistance device connected in series, a second electrical circuit connecting said source of electrical energy to said operative mechanism including said first and second switches connected in series, and means responsive to a variation in the temperature of the fluid in said first chamber and operatively connected to said lever to rotate said cam shaft to said first and second predetermined positions thereof, said first cam effective at the first predetermined position of said cam shaft to close said first switch to thereby deliver a relatively low current through said first electrical circuit to said operative mechanism, said third cam effective between the first and second predetermined positions of said cam shaft to decrease the resistance of said device to thereby deliver an increasing current through said first electrical circuit to said operative mechanism and said second cam effective at the second predetermined position of said cam shaft to close said second switch to thereby deliver a relatively high current through said second electrical circuit to said operative mechanism.

11. Means for controlling the temperature of a fluid circulating through a cooling system embodying a heat exchange unit and an electrically operated motor driven fan as the cooling medium, a circuit for providing a minimum current flow to energize the motor and as a consequence the fan at a low rate of speed, a second circuit for providing a maximum current flow to the motor to power the motor and as a consequence the fan at a high rate of speed, a third circuit to energize an operator-warning signal lamp, a common rotatable shaft carrying individual cams for closing an open switch in each circuit in sequence beginning with the switch associated with the first circuit, each switch being operable by its cam at a different rotated angular position of the shaft, mechanical means responsive to the temperature variations of the circulating fluid to rotate the shaft, and said mechanical means being responsive to rotate the shaft progressively with progressive variations in the temperature of the fluid, and the operator-warning signal circuit switch being arranged to close at an angular position of the shaft indicative of an excessively high temperature.

References Cited in the file of this patent

UNITED STATES PATENTS

| | | |
|---|---|---|
| 2,341,789 | Justus | Feb. 15, 1944 |
| 2,353,546 | Chisholm | July 11, 1944 |
| 2,396,000 | Findley | Mar. 5, 1946 |
| 2,459,734 | McCracken | Jan. 18, 1949 |